US012395008B2

(12) United States Patent
Vadlamani et al.

(10) Patent No.: US 12,395,008 B2
(45) Date of Patent: Aug. 19, 2025

(54) APPARATUS, SYSTEM, AND METHOD FOR EXTENDING HOLD-UP TIMES FOR COMPUTING DEVICES WITH REDUNDANT POWER SUPPLY UNITS

(71) Applicant: Juniper Networks, Inc., Sunnyvale, CA (US)

(72) Inventors: Siri Subrahmanyam Vadlamani, Bangalore (IN); Prakash B. Kamanuri, Kalyan Maharashtra (IN); Jaspal S. Gill, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 37 days.

(21) Appl. No.: 18/184,002

(22) Filed: Mar. 15, 2023

(65) Prior Publication Data

US 2024/0313573 A1    Sep. 19, 2024

(51) Int. Cl.
   *H02J 9/06* (2006.01)
   *G06F 1/18* (2006.01)
   *G06F 1/28* (2006.01)
   *G06F 1/30* (2006.01)
   *G06F 11/20* (2006.01)

(52) U.S. Cl.
   CPC ............ *H02J 9/061* (2013.01); *G06F 1/30* (2013.01); *G06F 1/189* (2013.01); *G06F 1/28* (2013.01); *G06F 11/2015* (2013.01)

(58) Field of Classification Search
   CPC .......... G06F 1/28; G06F 1/30; G06F 11/2015; G06F 1/189; H02J 9/061
   USPC ...................................... 713/340; 714/14, 24
   See application file for complete search history.

(56) References Cited

U.S. PATENT DOCUMENTS

| | | | |
|---|---|---|---|
| 2008/0164761 A1* | 7/2008 | O'Bryant | H02J 9/061 307/64 |
| 2010/0332896 A1* | 12/2010 | Wilson | G06F 1/30 714/E11.054 |
| 2013/0051101 A1* | 2/2013 | Cao | H02J 9/061 363/126 |
| 2014/0183959 A1* | 7/2014 | Kabasawa | H02J 9/061 307/66 |
| 2015/0244207 A1* | 8/2015 | Narita | H02J 9/061 307/64 |

(Continued)

OTHER PUBLICATIONS

Extended European Search Report for European Application No. 23178103.0, dated Dec. 5, 2023; 8 pgs.

*Primary Examiner* — Ji H Bae
(74) *Attorney, Agent, or Firm* — Greenberg Traurig, LLP

(57) ABSTRACT

A disclosed apparatus may extend hold-up times for computing devices with redundant power supply units (PSUs). For example, an apparatus may include a plurality of PSUs and a controller. In one example, the PSUs may be configured to convert power from at least one AC input into a direct current (DC) output and to provide the DC output to a computing device. In this example, the controller may be configured to detect a loss of the AC input and a failure of a first PSU included in the plurality of PSUs. The controller may also be configured to extend a hold-up time of a second PSU included in the plurality of PSUs by boosting an undervoltage lockout signal monitored by the computing device in response to detecting the loss of the AC input and the failure of the first PSU. Various other apparatuses, systems, and methods are also disclosed.

20 Claims, 7 Drawing Sheets

(56) References Cited

U.S. PATENT DOCUMENTS

| | | | |
|---|---|---|---|
| 2017/0329380 A1* | 11/2017 | Hung | H02M 1/4225 |
| 2017/0357309 A1* | 12/2017 | Wu | G06F 1/28 |
| 2020/0272220 A1* | 8/2020 | Mosalikanti | H03K 19/20 |
| 2022/0078548 A1* | 3/2022 | Dang | H03G 3/348 |
| 2022/0357956 A1 | 11/2022 | Johnson | |
| 2024/0195215 A1* | 6/2024 | Kondo | H02J 9/068 |

* cited by examiner

APPARATUS, SYSTEM, AND METHOD FOR EXTENDING HOLD-UP TIMES FOR COMPUTING DEVICES WITH REDUNDANT POWER SUPPLY UNITS

BACKGROUND

Power supply units (PSUs) are often able to supply sufficient power to sustain operation of computing devices for a short period after losing an alternating current (AC) source. For example, after a PSU loses its AC source, the PSU may be able to supply enough power to sustain a network device for several milliseconds. In this example, the PSU may produce a signal indicative of the status of the AC source, and the network device may monitor this signal to detect an imminent loss of the AC source. By doing so, the network device may be able to anticipate the resulting power loss and shut down safely and/or properly ahead of that power loss, thereby avoiding any unpredictable behavior. The amount of time that the PSU is able to sustain the network device after losing the AC source may sometimes be referred to as the PSU's hold-up time.

In certain configurations, a computing device may implement and/or rely on redundant PSUs to facilitate continued operation and/or ensure high availability in the event that one of the PSUs experiences a failure. For example, if the redundant PSUs lose their AC source(s), the PSUs may be able to collectively supply enough power to sustain the computing device for a safe and/or proper shutdown. However, if one of the PSUs fails and the other PSU loses its AC source, the hold-up time may be diminished and/or reduced, thereby potentially causing the computing device to shut down unsafely and/or improperly. The instant disclosure, therefore, identifies and addresses a need for additional apparatuses, systems, and methods for extending hold-up times for computing devices with redundant PSUs.

SUMMARY

As will be described in greater detail below, the instant disclosure generally relates to apparatuses, systems, and methods for extending hold-up times for computing devices with redundant PSUs. In some examples, an apparatus for accomplishing such a task may include and/or represent a plurality of PSUs and a controller. In one example, the PSUs may be configured to convert power from at least one AC input into a direct current (DC) output and to provide the DC output to a computing device. In this example, the controller may be configured to detect a loss of the AC input and a failure of a first PSU included in the plurality of PSUs. The controller may also be configured to extend a hold-up time of a second PSU included in the plurality of PSUs by boosting an undervoltage lockout (UVLO) signal monitored by the computing device in response to detecting the loss of the AC input and the failure of the first PSU.

Similarly, a corresponding system may include and/or represent a computing device, a plurality of PSUs, and a controller. In some examples, the PSUs may be configured to convert power from at least one AC input into a DC output and to provide the DC output to a computing device. In one example, the controller may be configured to detect a loss of the AC input and a failure of a first PSU included in the plurality of PSUs. In this example, the controller may also be configured to extend a hold-up time of a second PSU included in the plurality of PSUs by boosting a UVLO signal monitored by the computing device in response to detecting the loss of the AC input and the failure of the first PSU.

Additionally or alternatively, a corresponding method may include and/or involve (1) detecting, by a controller, a loss of an AC input electrically coupled to at least one of a plurality of PSUs configured to provide a DC output to a computing device, (2) detecting, by the controller, a failure of a first PSU included in the plurality of PSUs, and then in response to detecting the loss of the AC input and the failure of the first PSU, (3) extending a hold-up time of a second PSU included in the plurality of PSUs by boosting a UVLO signal monitored by the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
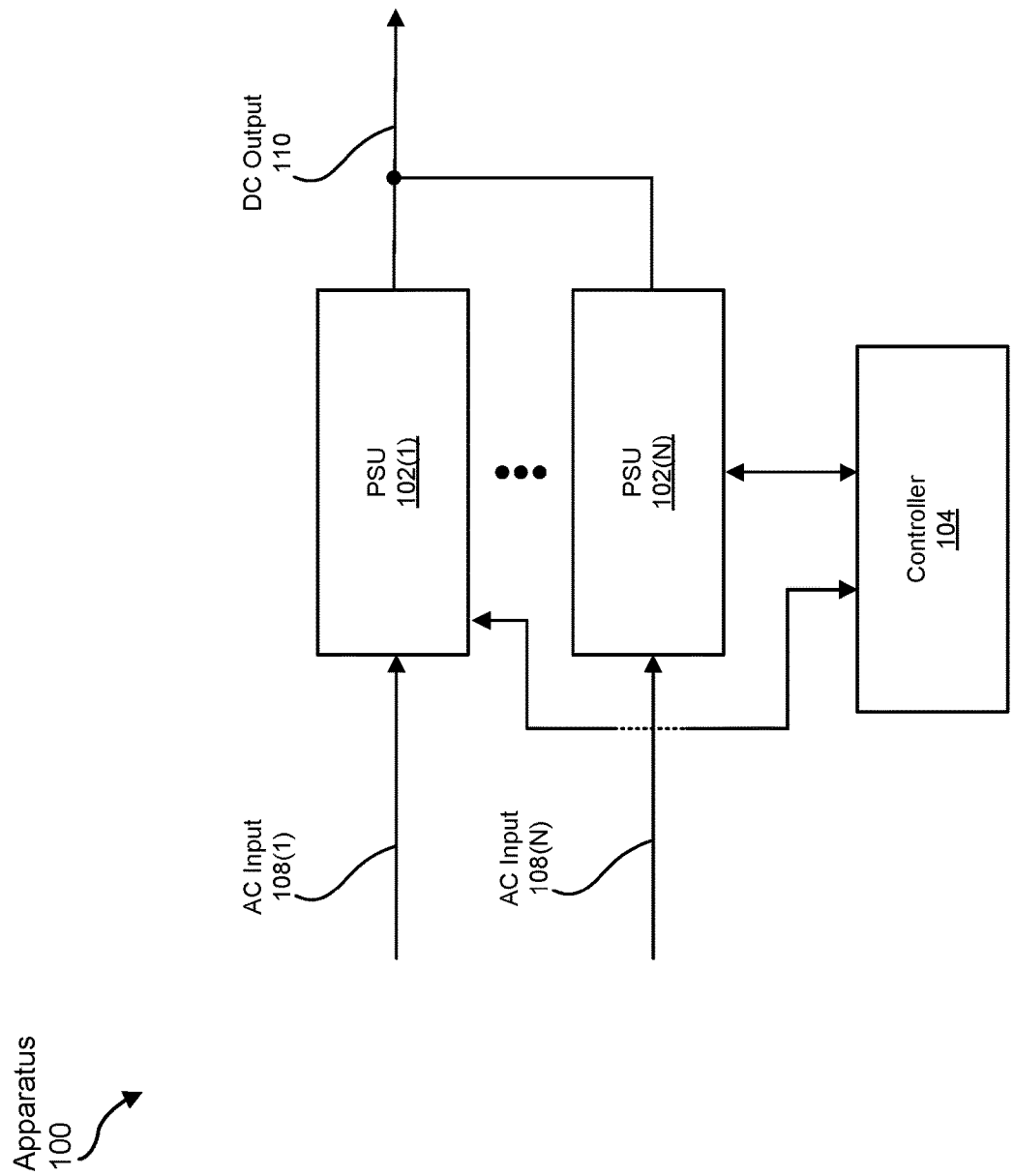
FIG. 1 is a block diagram of an exemplary apparatus capable of extending hold-up times for computing devices with redundant PSUs according to one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for extending hold-up times for computing devices with redundant PSUs. As will be explained in greater detail below, embodiments of the instant disclosure may involve increasing and/or spoofing a UVLO signal of a PSU to leverage and/or recover energy stored in a capacitor of the PSU. In some examples, the UVLO signal is monitored by a computing device (e.g., a router or switch) equipped with redundant PSUs, including the one whose UVLO signal is increased and/or spoofed.

In some conventional deployments, a UVLO signal may be designed, configured, and/or tuned to account for only 85 to 90 percent of the performance capabilities of the components included in a PSU due at least in part to their standard safety operating margins. As a result, in such conventional deployments, the PSU may be designed, configured, and/or tuned to avoid pushing the standard safety operating margins despite the PSU's potential to provide and/or deliver 10 to 15 percent more energy to the computing device after the PSU loses its AC power source. In such conventional deployments, this extra 10 to 15 percent of the available energy may be wasted and/or go unused by the PSU and/or the computing device.

By increasing and/or spoofing the UVLO signal of the PSU, embodiments of the instant disclosure may effectively extend and/or prolong the hold-up time of the PSU by leveraging and/or recovering this extra 10 to 15 percent of the energy stored in the capacitor. This extended hold-up time may enable the computing device to prepare for an imminent power loss and shut down safely and/or properly ahead of time, thereby avoiding any unpredictable behavior. Moreover, embodiments of the instant disclosure may be able to extend and/or prolong the hold-up time without incurring the cost of a bigger capacitor and while still complying with the corresponding regulations.

The following will provide, with reference to FIGS. 1-6 detailed descriptions of exemplary apparatuses, systems, components, and corresponding implementations for extending hold-up times for computing devices with redundant PSUs. Detailed descriptions of computer-implemented methods for extending hold-up times for computing devices with redundant PSUs will be provided in connection with FIG. 7.

FIG. 1 illustrates an exemplary apparatus 100 capable of extending hold-up times for computing devices with redundant PSUs. In some examples, apparatus 100 may include and/or represent PSUs 102(1)-(N) and a controller 104. In such examples, controller 104 may be electrically and/or communicatively coupled to one or more of PSUs 102(1)-(N). For example, controller 104 and one or more of PSUs 102(1)-(N) may communicate with one another via an inter-integrated circuit (I²C) bus, a serial peripheral interface (SPI) bus, and/or the like. In one example, PSUs 102(1)-(N) may be configured and/or arranged to convert and/or transform power from one or more AC inputs 108(1)-(N) into a DC output 110. In this example, PSUs 102(1)-(N) may be configured and/or arranged to provide and/or deliver DC output 110 to a computing device for consumption and/or use.

In some examples, AC inputs 108(1)-(N) may be electrically coupled to the same AC power source as one another. In other examples, AC inputs 108(1)-(N) may be electrically coupled to different AC power sources relative to one another.

In some examples, controller 104 may be configured and/or programmed to detect and/or identify a dual-fault condition, mode, and/or scenario in connection with PSUs 102(1)-(N). For example, controller 104 may detect and/or identify a loss of one of AC inputs 108(1)-(N) and/or the failure of one of PSUs 102(1)-(N). In this example, controller 104 may determine that the AC power source electrically coupled to one of AC inputs 108(1)-(N) is no longer supplying power to the corresponding PSU. In one example, the loss of this AC power source may result from the cable between the AC input and the wall outlet becoming disconnected and/or unplugged. In another example, the loss of this AC power source may result from a power outage and/or blackout affecting the building that houses apparatus 100.

In some examples, controller 104 may also be configured and/or programmed to extend the hold-up time of one of PSUs 102(1)-(N) by boosting the UVLO signal of that PSU in response to detecting the loss of the AC input and the failure of the PSU. In such examples, the UVLO signal may be monitored by controller 104 and/or the computing device electrically coupled to and/or equipped with PSUs 102(1)-(N) to detect the loss of an AC power source. As a specific example, controller 104 may detect and/or identify the loss of the AC power source on AC input 108(1) and the failure of PSU 102(N). In response to detecting the loss of the AC power source on AC input 108(1) and the failure of PSU 102(N), controller 104 may extend the hold-up time of PSU 102(1) by boosting the UVLO signal of PSU 102(1).

In some examples, PSUs 102(1)-(N) may each include and/or represent one or more physical devices and/or circuits capable of converting and/or transforming AC power into DC power. For example, PSUs 102(1)-(N) may each convert and/or transform mains AC electricity (e.g., 120-volt or 230-volt AC power) from the power grid into lower-voltage DC power (e.g., 12-volt or 54-volt DC power) sufficient to energize, operate, and/or run the computing device. In this example, PSUs 102(1)-(N) may supply, provide, and/or deliver the DC power to the computing device. In certain implementations, PSUs 102(1)-(N) may each include and/or be equipped with a cord that is plugged into a power outlet and/or generator. In such implementations, when their cords are plugged into a power outlet and/or generator in this way, PSUs 102(1)-(N) may each be able to draw AC power from the power outlet and/or generator, convert that AC power to DC power, and then deliver that DC power to the computing device.

In some examples, controller 104 may include and/or represent one or more hardware-implemented processors and/or compute modules capable of interpreting and/or executing computer-readable instructions. Additionally or alternatively, controller 104 may include and/or represent any type or form of circuitry that processes, converts, and/or transforms input, data, or signals in one way or another. In one example, controller 104 may include and/or represent multiple circuits distributed across apparatus 100 and/or throughout a larger computing system. Examples of controller 104 include, without limitation, physical processors, central processing units (CPUs), microprocessors, microcontrollers, field-programmable gate arrays (FPGAs), application-specific integrated circuits (ASICs), systems on chips (SoCs), parallel accelerated processors, tensor cores, integrated circuits, chiplets, portions of one or more of the same, variations or combinations of one or more of the same, and/or any other suitable processing device.

Controller 104 may represent part of and/or be incorporated into various devices and/or locations of a larger computing system. For example, controller 104 may represent part of and/or be incorporated into the computing device that is powered by one or more of PSUs 102(1)-(N) via DC output 110. In this example, controller 104 may also perform various tasks described herein on behalf of and/or in connection with the computing device. In another example, although not necessarily illustrated in this way in FIG. 1, controller 104 may represent part of and/or be incorporated into one or more of PSUs 102(1)-(N). In a further example, controller 104 may constitute and/or represent standalone circuitry and/or a separate device that is district from but associated with PSUs 102(1)-(N) and/or the computing device.

Figure 2:
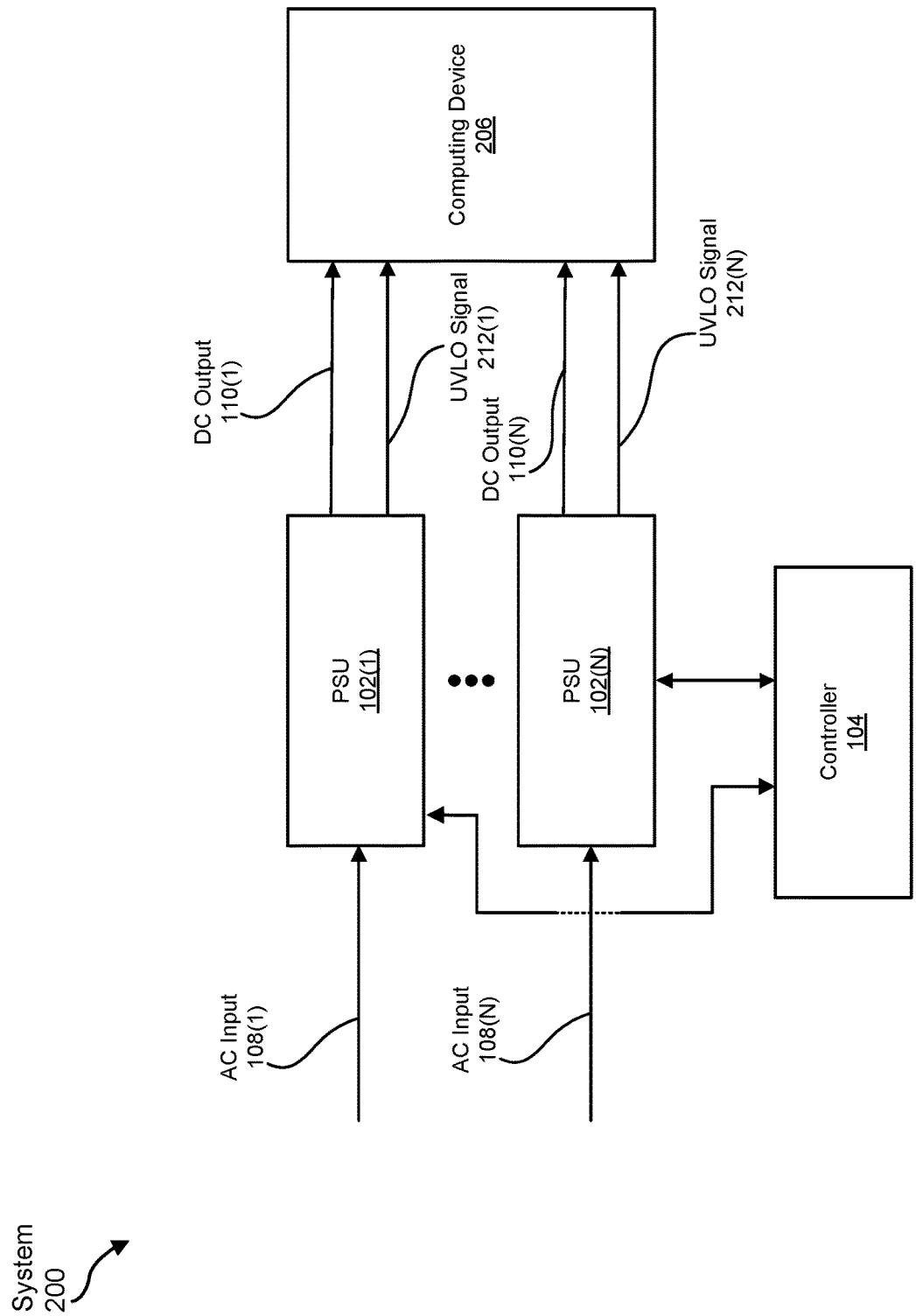
FIG. 2 is a block diagram of an exemplary system capable of extending hold-up times for computing devices with redundant PSUs according to one or more embodiments of this disclosure.

Exemplary apparatus 100 in FIG. 1 may be implemented in a variety of ways. For example, all or a portion of exemplary apparatus 100 may include and/or represent portions of an exemplary system 200 in FIG. 2 capable of extending hold-up times for a computing device 206 equipped with redundant PSUs 102(1)-(N). In some examples, system 200 may include and/or represent certain components, configurations, and/or features that perform and/or provide functionalities that are similar and/or identical to those described above in connection with FIG. 1. As illustrated in FIG. 2, computing device 206 may be electrically coupled to PSUs 102(1)-(N) via one or more DC outputs 110(1)-(N). Additionally or alternatively, computing device 206 may be communicatively coupled to PSUs 102(1)-(N) via one or more UVLO signals 212(1)-(N).

In some examples, like apparatus 100 in FIG. 1, system 200 may include and/or represent controller 104, which is communicatively coupled to PSUs 102(1)-(N) and/or computing device 206. In one example, controller 104 may monitor the statuses of PSUs 102(1)-(N) and/or their AC power source(s). For example, one or more of PSUs 102(1)-(N) may communicate and/or provide a periodic heartbeat to controller 104 (e.g., via an I²C bus, an SPI bus, or a separate signal). In this example, controller 104 may detect and/or determine that one of PSUs 102(1)-(N) has failed and/or gone down based at least in part on the sudden absence and/or discontinuation of the heartbeat. Additionally or alternatively, controller 104 may detect and/or determine that one of PSUs 102(1)-(N) has failed and/or gone down based at least in part on the PSU's non-responsiveness and/or lack of communication. Further, controller 104 may detect and/or determine that one of PSUs 102(1)-(N) has failed and/or gone down based at least in part on a message and/or notification received from the PSU.

As another example, one or more of PSUs 102(1)-(N) may communicate and/or provide the status of the corresponding AC source to controller 104 (e.g., via an I²C bus, an SPI bus, or a separate signal). In this example, controller 104 may detect and/or determine that the AC source for one or more of PSUs 102(1)-(N) has failed, gone down, and/or been lost based at least in part on the status communicated and/or provided by the corresponding PSU(s).

As a specific example, controller 104 may detect and/or identify the loss of the AC power source on AC input 108(N) and the failure of PSU 102(1). In response to detecting the loss of the AC power source on AC input 108(N) and the failure of PSU 102(1), controller 104 may extend and/or prolong the hold-up time of PSU 102(N) by boosting the UVLO signal of PSU 102(N). By doing so, controller 104 may effectively obtain, facilitate, and/or provide more time for computing device 206 to shut down safely and/or properly before the imminent power loss forces computing device 206 to do so in a potentially unsafe and/or improper way.

In some examples, computing device 206 may detect and/or identify an imminent power loss, which will likely cause computing device 206 to shut down, based at least in part on UVLO signals 212(1)-(N). For example, computing device 206 may monitor UVLO signals 212(1)-(N) for evidence that the AC source for one or more of PSUs 102(1)-(N) has failed, gone down, and/or been lost. Although not necessarily illustrated in this way in FIG. 2, controller 104 may represent part of and/or be incorporated into computing device 206 and may thus perform these tasks for computing device 206. In one example, UVLO signals 212(1)-(N) may include and/or represent analog signals indicative of the amounts of charge stored by capacitors (e.g., DC bulk capacitors) internal to PSUs 102(1)-(N), respectively.

In some examples, UVLO signals 212(1)-(N) may indicate, to computing device 206, whether PSUs 102(1)-(N) are able to provide a sufficient amount to power to sustain computing device 206. For example, if one or more of UVLO signals 212(1)-(N) drops from 400 volts and approaches a lower threshold (e.g., 270 volts or 300 volts), computing device 206 may sense and/or identify this drop from 400 volts toward the threshold as evidence that the corresponding AC source(s) has been lost. As a result of this drop, computing device 206 may determine that PSUs 102(1)-(N) are no longer able to provide sufficient power to sustain computing device 206 for much longer. To address this issue in advance of the forthcoming power loss, computing device 206 may initiate a shutdown process that saves its current state and/or data.

In some examples, computing device 206 may include and/or represent a physical device and/or system capable of reading computer-executable instructions, handling network traffic, and/or communicating with remote devices. In one example, computing device 206 may include and/or represent a network device that facilitates and/or supports the flow of traffic within a network and/or across networks. Additional examples of computing device 206 include, without limitation, routers (such as a transit label switching router, a label edge router, a provider edge router, a hub router, a spoke router, an autonomous system boundary router, and/or an area border router), switches, hubs, modems, bridges, repeaters, gateways (such as broadband network gateways), multiplexers, network adapters, network interfaces, linecards, collectors, client devices, laptops, tablets, desktops, servers, cellular phones, gaming consoles, portions of one or more of the same, variations or combinations of one or more of the same, and/or any other suitable computing device.

Figure 3:
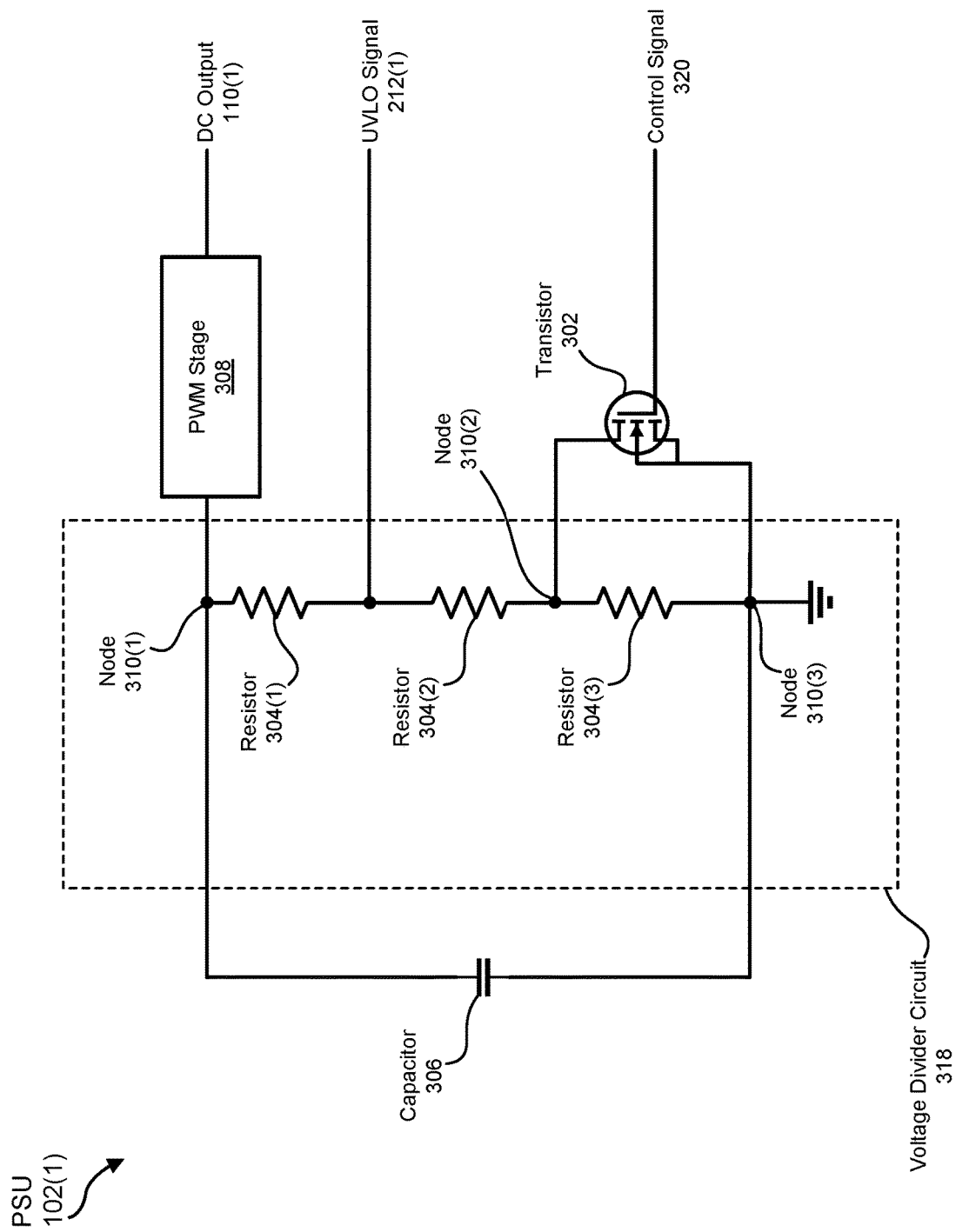
FIG. 3 is a block diagram of an exemplary PSU that facilitates extending hold-up times for computing devices according to one or more embodiments of this disclosure.

FIG. 3 illustrates a portion of an exemplary implementation of PSU 102(1) capable of extending hold-up times for a computing device. In some examples, PSU 102(1) may include and/or represent certain components, configurations, and/or features that perform and/or provide functionalities that are similar and/or identical to those described above in connection with either FIG. 1 or FIG. 2. As illustrated in FIG. 3, PSU 102(1) may include and/or represent a transistor 302, a capacitor 306, a pulse-width modulation (PWM) stage 308, and/or resistors 304(1), 304(2), and 304(3).

In some examples, one terminal of capacitor 306, resistor 304(1), and PWM stage 308 may be electrically coupled to one another at node 310(1). In one example, one terminal of resistors 304(1) and 304(2) may be electrically coupled to one another at a node that represents and/or carries UVLO signal 212(1). In this example, one terminal of resistors 304(2), resistor 304(3), and transistor 302 may be electrically coupled to one another at node 310(2). Additionally or alternatively, one terminal of resistor 304(3), capacitor 306, and transistor 302 may be electrically coupled to one another at node 310(3). In certain implementations, another terminal of PWM stage 308 may represent and/or carry DC output 110(1) to computing device 206, and another terminal of transistor 302 may represent and/or carry a control signal 320 provided by controller 104.

In some examples, transistor 302 may include and/or represent a metal-oxide-semiconductor field-effect transistor (MOSFET). For example, transistor 302 may include and/or represent an n-type or n-channel MOSFET whose source, drain, and gate are electrically coupled to node 310(3), node 310(2), and control signal 320, respectively. In an alternative example (not necessarily illustrated or reflected in FIG. 3), transistor 302 may include and/or represent a p-type or p-channel MOSFET whose source, drain, and gate are electrically coupled to node 310(3), node 310(2), and control signal 320 in the same configuration or a different configuration.

In some examples, node 310(1) may include and/or represent a power rail configured to deliver electric current from capacitor 306 to PWM stage 308. In one example, node 310(3) may include and/or represent an electrical ground configured to serve as a reference point for voltage levels within PSU 102(1). Additionally or alternatively, node 310(2) may include and/or represent a bypass node configured to be selectively shorted to ground when the AC source is present and delivering power to PSU 102(1).

In some examples, PWM stage 308 may include and/or represent switching circuitry that reduces, converts, and/or transforms the higher voltage present on node 310(1) to the lower voltage present on DC output 110(1). In one example, this switching circuitry may achieve and/or accomplish this reduction of the higher input voltage to the lower output voltage via PWM. In this example, the PWM may be tuned and/or applied to output power of a specific voltage level (e.g., 12 or 54 volts) for consumption by computing device 206.

In some examples, transistor 302 may serve and/or be implemented as a switch that activates and/or deactivates resistor 304(3) in a voltage divider circuit 318 that produces UVLO signal 212(1). For example, PSU 102(1) may include and/or represent voltage divider circuit 318, which involves and/or is composed of resistors 304(1)-(3). In one example, under normal operating conditions, controller 104 may configure, set, and/or program control signal 320 to short and/or connect node 310(2) to node 310(3) via transistor 302. In this example, the short and/or connection formed between nodes 310(2) and 310(3) may effectively deactivate, exclude, and/or bypass resistor 304(3) from voltage divider circuit 318, thereby lowering and/or reducing the voltage level of UVLO signal 212(1).

However, in the event that a dual-fault condition is detected, controller 104 may modify control signal 320 to open and/or break the short or connection between nodes 310(2) and 310(3) via transistor 302. By doing so, controller 104 may effectively activate, include, and/or add resistor 304(3) in voltage divider circuit 318, thereby boosting and/or increasing the voltage level of UVLO signal 212(1). The boosted and/or increased voltage level of UVLO signal 212(1) may cause and/or enable computing device 206 to leverage and/or recover additional energy stored in capacitor 306. The leveraging and/or recovery of additional energy stored in capacitor 306 may result in an extended hold-up time provided by PSU 102(1). In other words, the leveraging and/or recovery of additional energy stored in capacitor 306 may support and/or facilitate extended protection for computing device 206 in the event of an AC dropout condition.

Figure 4:
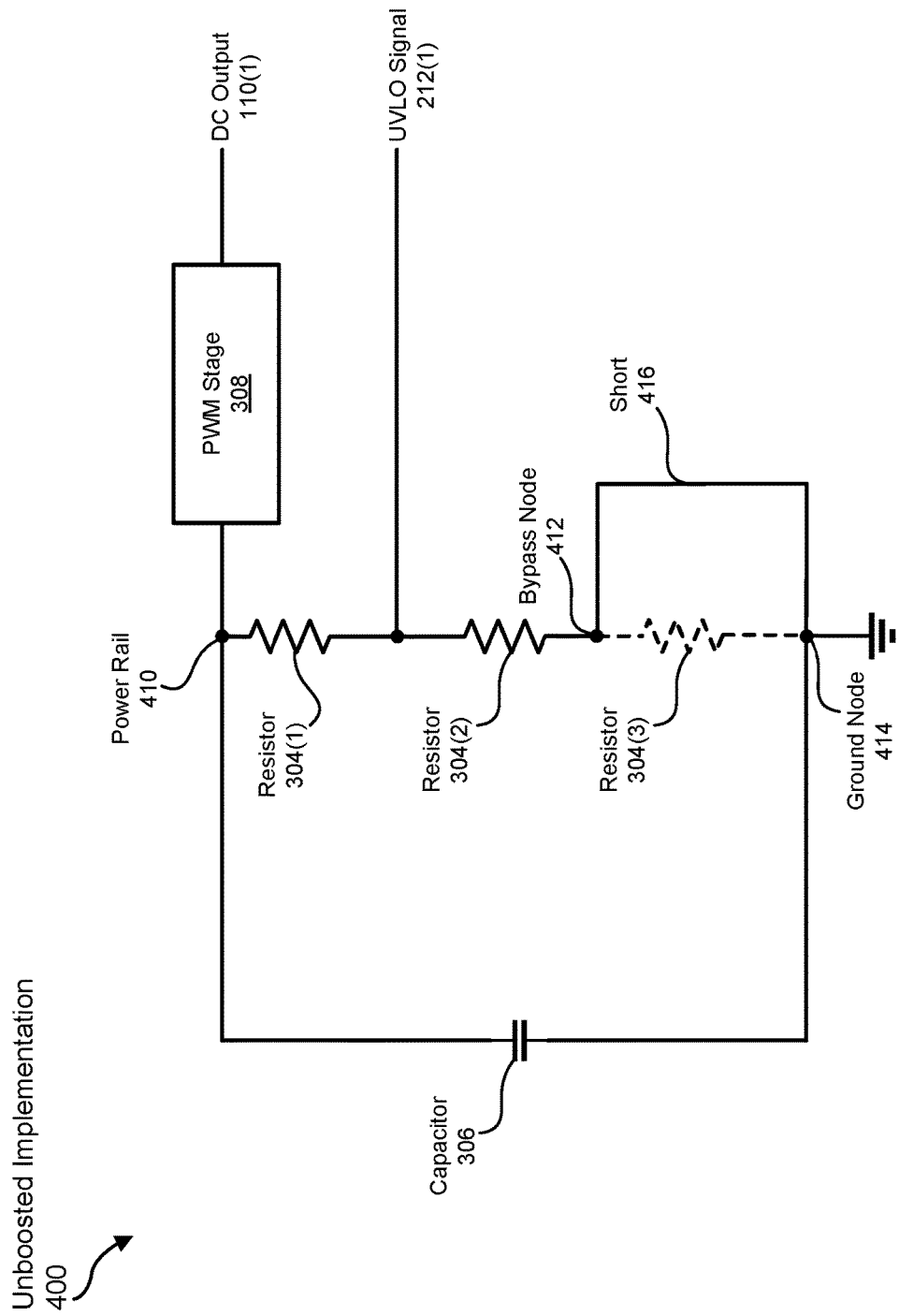
FIG. 4 is a block diagram of an exemplary unboosted implementation of a PSU that facilitates extending hold-up times for computing devices according to one or more embodiments of this disclosure.

FIG. 4 illustrates an exemplary unboosted implementation 400 of PSU 102(1) that exists and/or is applied under normal operating conditions. In some examples, unboosted implementation 400 of PSU 102(1) may include and/or represent certain components, configurations, and/or features that perform and/or provide functionalities that are similar and/or identical to those described above in connection with any of FIGS. 1-3. As illustrated in FIG. 4, unboosted implementation 400 of PSU 102(1) may involve deactivating and/or bypassing resistor 304(3) in the voltage divider circuit via a short 416, which is created and/or formed by closing a programmable switch (e.g., transistor 302).

In some examples, unboosted implementation 400 of PSU 102(1) may include and/or involve a power rail 410 that delivers and/or provides electric current and/or charge from capacitor 306 to PWM stage 308. In one example, unboosted implementation 400 of PSU 102(1) may include and/or involve a bypass node 412 that forms short 416 to a ground node 414. In this example, the resistance and/or impedance of resistor 304(3) may be effectively bypassed and/or omitted from the voltage divider circuit that renders and/or produces UVLO signal 212(1). As a result, the voltage level of UVLO signal 212(1) may be lower and/or reduced relative to a boosted implementation of PSU 102(1) in which the voltage divider circuit includes and/or accounts for the resistance and/or impedance of resistor 304(3).

Figure 5:
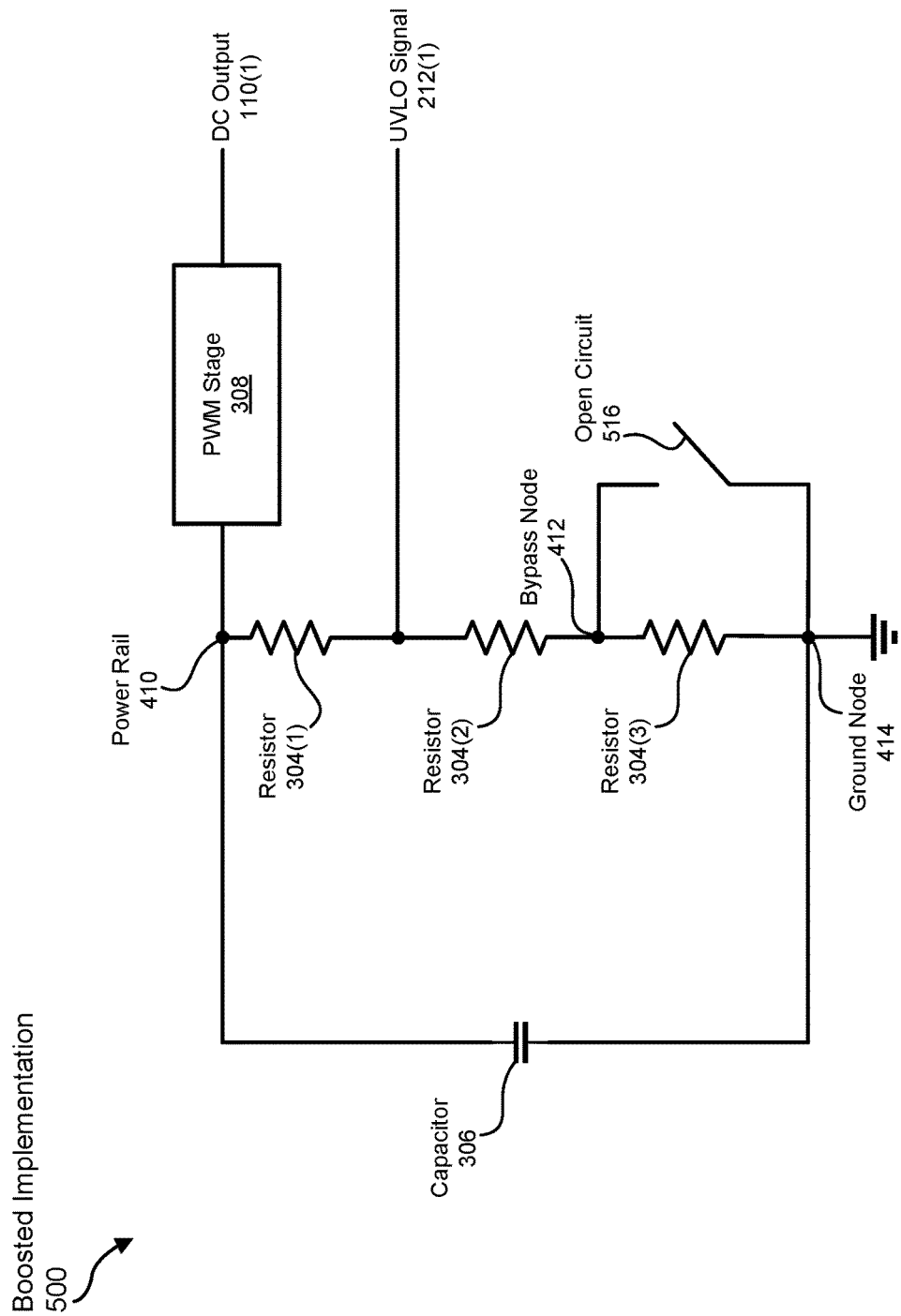
FIG. 5 is a block diagram of an exemplary boosted implementation of a PSU that facilitates extending hold-up times for computing devices according to one or more embodiments of this disclosure.

FIG. 5 illustrates an exemplary boosted implementation 500 of PSU 102(1) that is triggered and/or applied in response to a dual-fault condition and/or event. In some examples, boosted implementation 500 of PSU 102(1) may include and/or represent certain components, configurations, and/or features that perform and/or provide functionalities that are similar and/or identical to those described above in connection with any of FIG. 1-4. As illustrated in FIG. 5, boosted implementation 500 of PSU 102(1) may involve activating and/or adding resistor 304(3) in the voltage divider via an open circuit 516, which is created and/or formed by opening a programmable switch (e.g., transistor 302).

In some examples, the resistance and/or impedance of resistor 304(3) may be effectively activated in and/or added to the voltage divider circuit that renders and/or produces UVLO signal 212(1). As a result, the voltage level of UVLO signal 212(1) may be boosted and/or increased relative to unboosted implementation 400 of PSU 102(1) in which the voltage divider circuit excludes and/or is unaffected by the resistance and/or impedance of resistor 304(3).

In some examples, boosted implementation 500 may extend and/or prolong the hold-up time of PSU 102(1) by a certain percentage that enables computing device 206 to save its current state and/or shut down safely or properly. In one example, boosted implementation 500 may extend and/or prolong the hold-up time by ten percent, twenty percent, or more relative to unboosted implementation 400. For example, boosted implementation 500 may extend and/or prolong the hold-up time of PSU 102(1) from 14 milliseconds to 17.42 milliseconds.

In some examples, boosted implementation 500 may boost and/or increase the voltage of UVLO signal 212(1) by a certain percentage that enables computing device 206 to leverage and/or recover a sufficient amount of energy from capacitor 306 while still complying with the standard safety operating margins of the components included in PSU 102(1). In one example, boosted implementation 500 may boost and/or increase the voltage of UVLO signal 212(1) by five percent, ten percent, or more relative to unboosted implementation 400. For example, boosted implementation 500 may boost and/or increase the voltage of UVLO signal 212(1) from 270 volts to 300 volts.

In some examples, controller 104 may track and/or maintain a count representative of the number of times that the hold-up time of PSU 102(1) has been extended and/or prolonged by boosting UVLO signal 212(1). In one example, controller 104 may create, store, and/or record a timestamp every time that the hold-up time is extended and/or prolonged by boosting UVLO signal 212(1). In this example, the count and/or timestamp(s) may provide insight into whether such hold-up time extensions and/or UVLO boosts cause and/or contribute to an eventual failure of PSU 102(1). For example, after having boosted UVLO signal 212(1) on one or more occasions in the past, controller 104 may detect and/or identify a failure of PSU 102(1). In response to detecting the failure of PSU 102(1), controller 104 may provide information that includes the count and/or timestamp(s) to a user device (e.g., operated by an administrator) to facilitate analyzing and/or diagnosing PSU 102(1). The operator of the user device may then perform a diagnostic analysis on the failed PSU based at least in part on the information including the count and/or timestamp(s).

Figure 6:
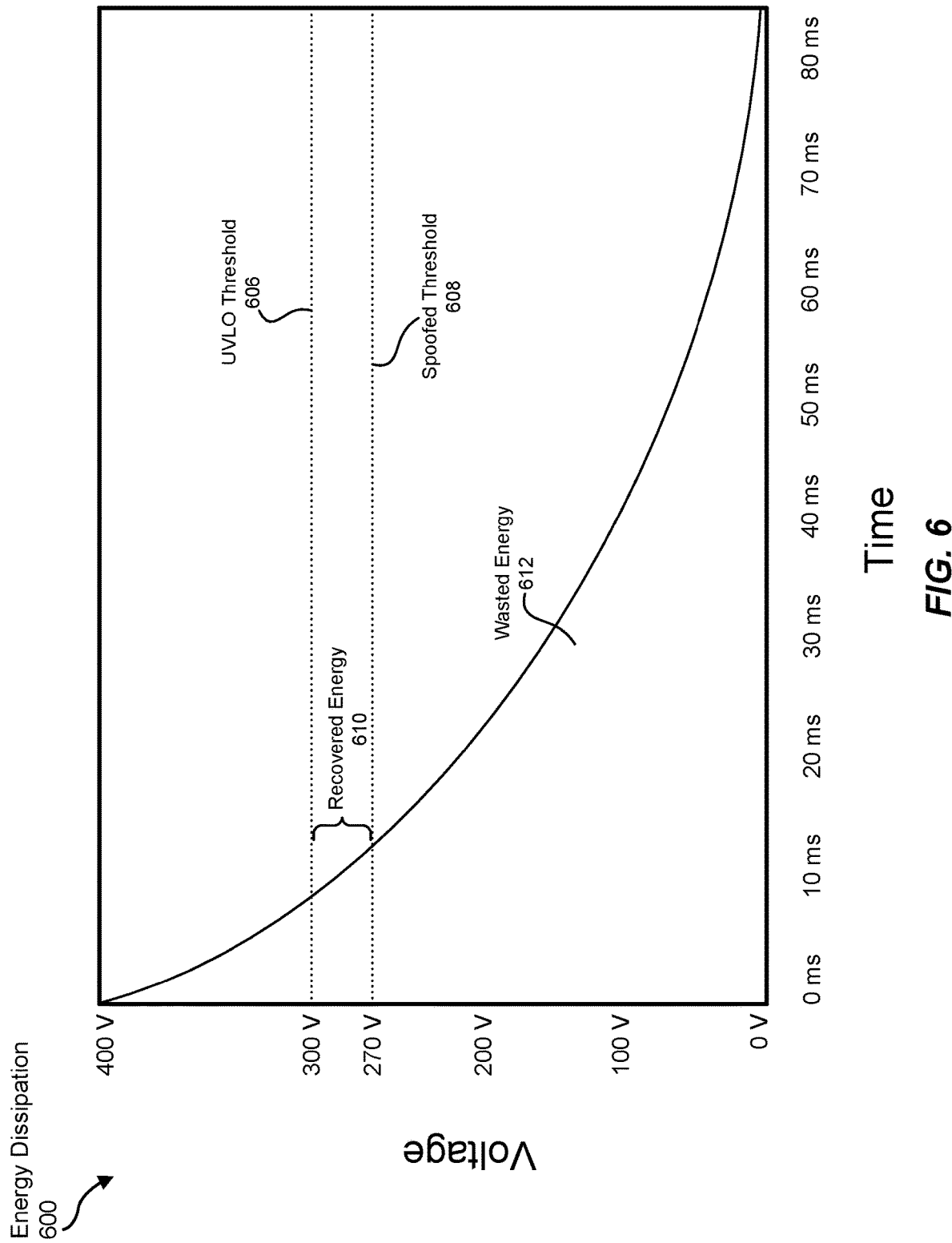
FIG. 6 is an illustration of an exemplary representation of energy dissipated by a PSU after the loss of an AC power source according to one or more embodiments of this disclosure.

FIG. 6 illustrates an exemplary energy dissipation 600 of capacitor 306 in PSU 102(1) after the AC source electrically coupled to PSU 102(1) is lost and/or goes down. As illustrated in FIG. 6, energy dissipation 600 may involve the voltage level dropping from 400 volts toward 0 volts over a period of roughly 80 milliseconds. In some examples, a conventional PSU may support, facilitate, and/or provide an unextended hold-up time of approximately 13 milliseconds under a UVLO threshold 606 that does not involve any boosting. However, PSU 102(1) may support, facilitate, and/or provide an extended hold-up time of approximately 17 milliseconds under a spoofed threshold 608 that does involve some boosting consistent with the implementations described herein. By doing so, PSU 102(1) may be able to leverage and/or gain access to recovered energy 610 between 270 and 300 volts of energy dissipation 600. In one example, energy dissipation 600 may involve wasted energy 612 that is lost and/or unusable due at least in part to PWM stage 308 of PSU 102(1) being unable to function properly below spoofed threshold 608.

In some examples, the various apparatuses, devices, and/or systems described in connection with FIGS. 1-6 may include and/or represent one or more additional circuits, components, and/or features that are not necessarily illustrated and/or labeled in FIGS. 1-6. For example, apparatus 100, system 200, and/or PSUs 102(1)-(N) may also include and/or represent additional analog and/or digital circuitry, onboard logic, transistors, antennas, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support extending hold-up times. In certain implementations, one or more of these additional circuits, components, and/or features may be inserted and/or applied between any of the existing circuits, components, and/or features illustrated in FIGS. 1-6 consistent with the aims and/or objectives described herein. Accordingly, the electrical and/or communicative couplings described with reference to FIGS. 1-6 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides electrical continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide electrical continuity from one of those two components to the other. In other words, the indirect coupling may include and/or incorporate at least one additional component between those two components.

Figure 7:
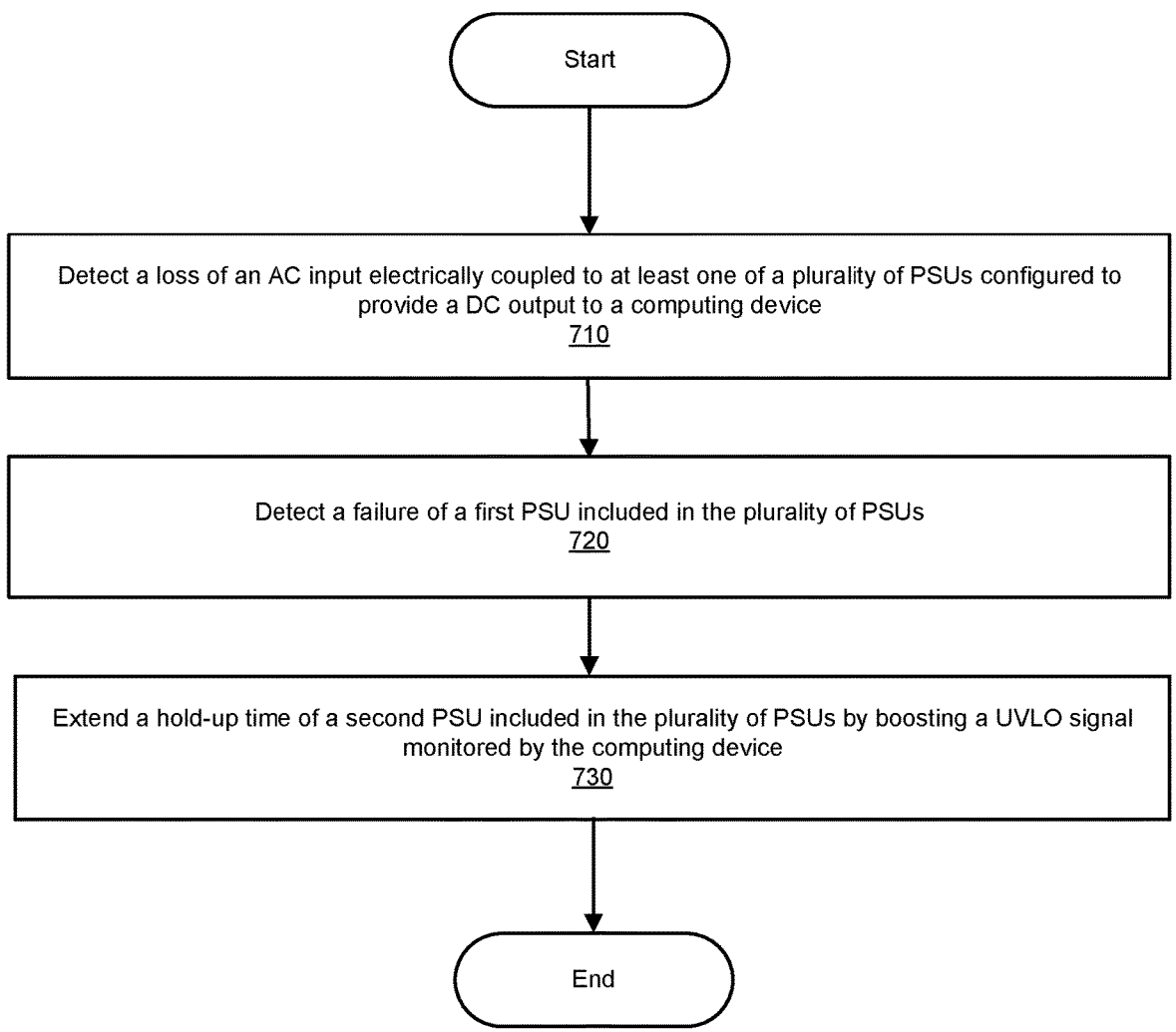
FIG. 7 is a flow diagram of an exemplary method for extending hold-up times for computing devices with redundant PSUs according to one or more embodiments of this disclosure.

FIG. 7 is a flow diagram of an exemplary method 700 for extending hold-up times for computing devices with redundant PSUs. In one example, the steps shown in FIG. 7 may be performed by a controller incorporated into and/or associated with a computing device powered by redundant PSUs. Additionally or alternatively, the steps shown in FIG. 7 may incorporate and/or involve certain sub-steps and/or variations consistent with the descriptions provided above in connection with FIGS. 1-6.

As illustrated in FIG. 7, method 700 may include and/or involve the step of detecting a loss of an AC input electrically coupled to at least one of a plurality of PSUs configured to provide a DC output to a computing device (710). Step 710 may be performed in a variety of ways, including any of those described above in connection with FIGS. 1-6. For example, a controller may detect the loss of an AC input electrically coupled to one or more redundant PSUs that provide a DC output to a computing device. In one example, the loss of the AC input may occur as a result of a power outage. In another example, the loss of the AC input may occur as a result of the PSU's power cable getting unplugged and/or disconnected from the wall outlet or the PSU itself.

Method 700 may also include and/or involve the step of detecting a failure of a first PSU included in the plurality of PSUs (720). Step 720 may be performed in a variety of ways, including any of those described above in connection with FIGS. 1-6. For example, the controller may detect the failure of one of the redundant PSUs that provide the DC output to the computing device. In one example, the controller may detect and/or determine that the PSU has failed and/or gone down based at least in part on the sudden absence and/or discontinuation of the heartbeat. Additionally or alternatively, the controller may detect and/or determine that the PSU has failed and/or gone down based at least in part on the PSU's non-responsiveness and/or lack of communication.

Method 700 may further include and/or involve the step of extending a hold-up time of a second PSU included in the plurality of PSUs by boosting a UVLO signal monitored by the computing device in response to detecting the loss of the AC input and the failure of the first PSU (730). Step 730 may be performed in a variety of ways, including any of those described above in connection with FIGS. 1-6. For example, the controller may boost the UVLO signal of the other PSU in response to detecting the loss of the AC input and the failed PSU. By boosting the UVLO signal in this way, the controller may extend and/or prolong the hold-up time of the other PSU, thereby enabling the computing device to shut down safely and/or properly before losing power altogether.

In some examples, one or more of the exemplary embodiments disclosed herein may be encoded as a computer program (also referred to as computer software, software applications, computer-readable instructions, and/or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a plurality of power supply units (PSUs) configured to:
      convert power from at least one alternating current (AC) input into a direct current (DC) output; and
      provide the DC output to a computing device; and
   circuitry configured to:
      detect a loss of the AC input and a failure of a first PSU included in the plurality of PSUs; and
      in response to detecting the loss of the AC input and the failure of the first PSU, extend a hold-up time of a second PSU included in the plurality of PSUs by:
         boosting an undervoltage lockout (UVLO) signal monitored by the computing device; and
         releasing energy stored by the second PSU for use in the DC output due at least in part to the UVLO signal having been boosted.

2. The apparatus of claim 1, wherein the UVLO signal indicates, to the computing device, whether the second PSU is able to provide a sufficient amount of power to sustain the computing device.

3. The apparatus of claim 1, wherein the circuitry is further configured to extend the hold-up time of the second PSU by modifying a switch that activates a resistor in a voltage divider circuit that produces the UVLO signal.

4. The apparatus of claim 3, wherein the voltage divider circuit comprises:
   at least one resistor electrically coupled between a first node and the UVLO signal;
   at least one additional resistor electrically coupled between the UVLO signal and a second node;
   at least one other resistor electrically coupled between the second node and a third node; and
   the switch electrically coupled between the second node and the third node.

5. The apparatus of claim 4, wherein the switch comprises a transistor whose gate is electrically coupled to the circuitry.

6. The apparatus of claim 4, wherein:
   the first node comprises a power rail configured to deliver electric current from a capacitor that stores the energy to a pulse-width modulation stage of the second PSU;
   the second node comprises a bypass node configured to be selectively shorted to an electrical ground when the switch is closed; and
   the third node comprises the electrical ground.

7. The apparatus of claim 1, wherein the circuitry is further configured to extend the hold-up time of the second PSU by at least twenty percent.

8. The apparatus of claim 1, wherein the circuitry is further configured to boost the UVLO signal by at least five percent.

9. The apparatus of claim 1, wherein the circuitry is further configured to track a count representative of a number of times that the hold-up time of the second PSU has been extended by boosting the UVLO signal.

10. The apparatus of claim 9, wherein the circuitry is further configured to record, in connection with the count, a timestamp for each time that the hold-up time of the second PSU has been extended.

11. The apparatus of claim 10, wherein the circuitry is further configured to:
   detect a failure of a second PSU; and
   in response to detecting the failure of the second PSU, provide information that includes the count and the timestamp to a user device to facilitate a diagnostic analysis of the second PSU.

12. A system comprising:
   a computing device;
   a plurality of power supply units (PSUs) electrically coupled to the computing device and configured to convert power from an alternating current (AC) input into a direct current (DC) output; and
   circuitry configured to:
      detect a loss of the AC input and a failure of a first PSU included in the plurality of PSUs; and
      in response to detecting the loss of the AC input and the failure of the first PSU, extend a hold-up time of a second PSU included in the plurality of PSUs by:
         boosting an undervoltage lockout (UVLO) signal monitored by the computing device; and
         releasing energy stored by the second PSU for use in the DC output due at least in part to the UVLO signal having been boosted.

13. The system of claim 12, wherein the UVLO signal indicates, to the computing device, whether the second PSU is able to provide a sufficient amount of power to sustain the computing device.

14. The system of claim 12, wherein the circuitry is further configured to extend the hold-up time of the second PSU by modifying a switch that activates a resistor in a voltage divider circuit that produces the UVLO signal.

15. The system of claim 14, wherein the voltage divider circuit comprises:
   at least one resistor electrically coupled between a first node and the UVLO signal;
   at least one additional resistor electrically coupled between the UVLO signal and a second node;
   at least one other resistor electrically coupled between the second node and a third node; and
   the switch electrically coupled between the second node and the third node.

16. The system of claim 15, wherein the switch comprises a transistor whose gate is electrically coupled to the circuitry.

17. The system of claim 15, wherein:
   the first node comprises a power rail configured to deliver electric current from a capacitor that stores the energy to a pulse-width modulation stage of the second PSU;
   the second node comprises a bypass node configured to be selectively shorted to an electrical ground when the switch is closed; and
   the third node comprises the electrical ground.

18. The system of claim 12, wherein the circuitry is further configured to extend the hold-up time of the second PSU by at least twenty percent.

19. The system of claim 12, wherein the circuitry is further configured to boost the UVLO signal by at least five percent.

20. A method comprising:
   detecting, by circuitry, a loss of an alternating current (AC) input electrically coupled to at least one of a plurality of power supply units (PSUs) configured to provide a DC output to a computing device;
   detecting, by the circuitry, a failure of a first PSU included in the plurality of PSUs; and
   in response to detecting the loss of the AC input and the failure of the first PSU, extending a hold-up time of a second PSU included in the plurality of PSUs by:
      boosting an undervoltage lockout (UVLO) signal monitored by the computing device; and
      releasing energy stored by the second PSU for use in the DC output due at least in part to the UVLO signal having been boosted.

* * * * *